United States Patent [19]

Arita

[11] Patent Number: 4,994,702
[45] Date of Patent: Feb. 19, 1991

[54] MOTOR

[75] Inventor: Yoji Arita, Yokohama, Japan

[73] Assignee: Mitsubishi Kasei Corporation, Tokyo, Japan

[21] Appl. No.: 554,892

[22] Filed: Jul. 20, 1990

[51] Int. Cl.⁵ .............................................. H02K 1/12
[52] U.S. Cl. .................................. 310/254; 310/154; 310/261; 310/49 R
[58] Field of Search ............... 310/154, 254, 261, 269, 310/258, 49 R

[56] References Cited

U.S. PATENT DOCUMENTS

| | | | |
|---|---|---|---|
| 4,868,438 | 9/1989 | Okamoto et al. | 310/166 |
| 4,891,538 | 1/1990 | Oudet | 310/254 |
| 4,897,570 | 1/1990 | Ishikawa et al. | 310/254 |
| 4,899,074 | 2/1990 | West | 310/190 |
| 4,935,655 | 6/1990 | Ebner | 310/154 |
| 4,945,330 | 7/1990 | Arita | 310/154 |
| 4,949,000 | 8/1990 | Petersen | 310/179 |

Primary Examiner—Steven L. Stephan
Assistant Examiner—Edward To
Attorney, Agent, or Firm—Stephen F. K. Yee

[57] ABSTRACT

A motor includes a field magnet system comprised of plural permanent magnetic poles arranged in a circle and an armature with plural poles each facing the magnetic poles of the field magnetic system. The widthwise length of a magnetic flux generating area of the permanent magnetic poles varies with the rotational angle to eliminate a cogging torque caused by higher harmonic wave components of the magnetic flux.

4 Claims, 13 Drawing Sheets

FIG. I(c)
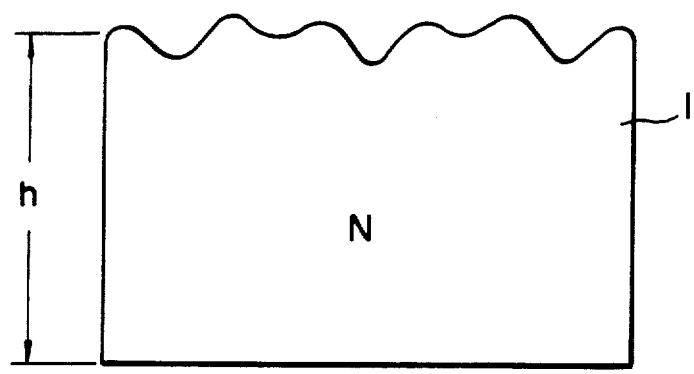
FIG. I(d)
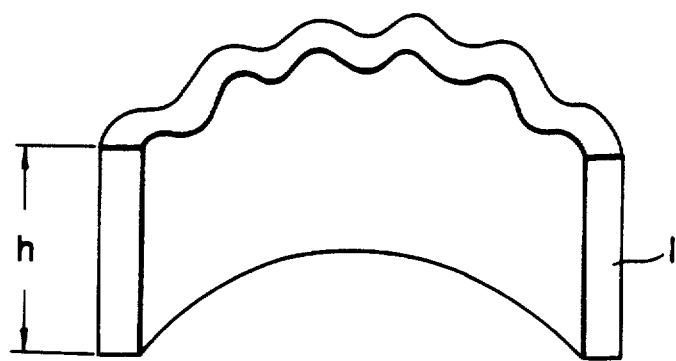

FIFTH-ORDER MODE

FUNDAMENTAL MODE

← ROTATIONAL ANGLE (θ)

← ROTATIONAL ANGLE (θ)

ROTATIONAL ANGLE (θ)

ROTATIONAL ANGLE (θ)

MOTOR

BACKGROUND OF THE INVENTION

1. Field of the Invention

The present invention relates to a motor, and more particularly, to a core type motor, which reduces its cogging torque up to the utmost limits, and which controls its torque ripples, caused by a driving current, at the state of almost zero cogging torque.

2. Prior Art

A schematic cross-sectional view of a prior art motor is shown in FIG. 14(a), which essentially comprises two magnetic pieces 1, a magnetic yoke 2 and an armature 3. The magnetic pieces 1, each made of a semi-circular permanent magnet, are fixed to the magnetic yoke 2 and are arranged in circle such that the their magnetic poles facing the the armature 3 are N-pole and S-pole, respectively. The armature 3 is rotatable about a rotating axis 5 and provided with three protruding poles whose outer ends extend a predetermined length in the peripheral direction, respectively. Each of the protruding poles has a coil 4 wound therearound and energized in a known manner. The outer end surface of each of the protruding poles faces the magnetic poles of the magnetic pieces 1 with a gap g. The rotating axis 5, together with the armature 3 and the magnetic pieces 1, are supported by a supporting member (not shown). FIG. 14(b) is a view illustrating the distribution of the magnetic flux density on the magnetic pole surface, in the motor rotating direction.

In such kind of prior art motor, a cogging torque has been a serious problem, because it causes a big problem of torque ripple. For this, several methods have been proposed to reduce the cogging torque. For example, one of them adapts measures to distribute the magnetization of the magnetic pieces 1 sinusoidally in the motor rotating direction, and another one adapts measures to control a magnetized angle of the magnetization of the magnetic pieces 1 (see Japanese Patent Laid-Open No. 61-254,045/1986. However, no method has been successful in eliminating the cogging torque completely.

SUMMARY OF THE INVENTION

Accordingly, it is an object of the present invention to provide a motor which eliminate the cogging torque almost completely.

It is another object of the present invention to provide a motor which can control a torque ripple due to a drive current at the state of substantially no cogging torque.

In accomplishing the foregoing objects, there is provided in accordance with the present invention a motor comprising: a field magnet system comprising m-number of permanent magnetic poles arranged in a circle such that adjacent two permanent magnetic poles have opposite polarity to each other; and an armature with p-number of poles, the outer end of each of the poles facing the magnetic poles of the field magnet system: said field magnet system having a magnetic flux generating area whose widthwise length h ($\theta$) perpendicular to the rotational direction of the armature varies with a rotational angle $\theta$ of the armature in accordance with the following formula:

$$h(\theta) = h_0 - \sum_{n=1}^{\infty} a_n \cos(2\pi n\theta/T) + \sum_{n=1}^{\infty} b_n \sin(2\pi n\theta/T) \quad (1)$$

wherein n is an integer of $(i \times j) \pm 1$ where j is an even number of 2 to 20, $a_n$ is a coefficient for cosine components when expanding the widthwise length in a series, $b_n$ is a coefficient for sine components when expanding the widthwise length in a series and is not zero for at least one value of n, T is a period of rotation of the armature through an angle corresponding to the peripheral length of a pair of adjacent N-pole and S-pole, i is an integer given by p/q where q is the greatest common measure of m/2 and p, with m being the number at magnetic poles and p being the number of poles and $h_o$ is equal to H when $0 \leq \theta < \theta$nd equal to $-H$ when $\theta \leq \theta < 2\pi$ where H is a standard widthwise length of the field magnet system and its positive and negative sign only indicates its polarity In the above formula (1), "standard widthwise length" means the constant widthwise length into which no variation is incorporated. Namely, it corresponds to the widthwise length of the prior art motor and does not include the change of polarity. In the prior art motor, h is equal to H when $0 \leq \theta < \pi$ and equal to $-H$ when $\pi \leq \theta < 2\pi$, and the coefficients $a_n$ and $b_n$ are all zero.

The feature of the present invention is to employ the field magnet system satisfying the above formula. More specifically, a specific magnetized pattern may be given to the parmanent magnets, or the shape of permanent magnets may be changed so that their widthwise length satisfies the above conditions. Further, a part of the magnetic pole surface of the permanent magnets may be covered with a thin soft magnetic material so that the widthwise length of the effective magnetic pole areas facing the poles of the armature satisfies the above conditions.

With such configuration, a cogging torque can be reduced sufficiently, and also a torque ripple can be eliminated at the condition of substantially zero cogging torque.

The present invention also provides a method of trimming a torque characteristic of a motor comprising a field magnet system with a constant widthwise length comprising plural permanent magnetic poles arranged in a circle such that the adjacent two permanent magnetic poles have opposite polarity to each other, and an armature with plural poles, the outer end surface of each of the poles facing the magnetic poles of the field magnet system, said method comprising the steps of: measuring the distribution of the magnetic flux generated by the field magnet system relative to the rotational angle of the armature; evaluating the harmonic wave components of the magnetic flux generated by the field magnet system by expanding in a series a function expressing the distribution curve of the magnetic flux; measuring the cogging torque generated by the field magnet system relative to the rotational angle of the armature; examining the relationship between the harmonic wave conponents of the magnetic flux and the cogging torque; and adjusting the widthwise length of the magnetic flux generating area of the field magnet system by incorporating into the widthwise length the variation corresponding to the selected harmonic wave components which cause the cogging torque to be eliminated.

BRIEF DESCRIPTION OF THE DRAWINGS

FIG. 1(c) is a front development view of another example of the magnetic pieces in FIG. 1, FIG. 1(d) is a perspective view illustrating the magnetic pieces in FIG. 1(c), FIGS. 2(a) to 2(d) illustrate how to add the fifth-order mode to the fundamental mode.

DETAILED DESCRIPTION OF THE PREFERRED EMBODIMENTS

Figure 14A:
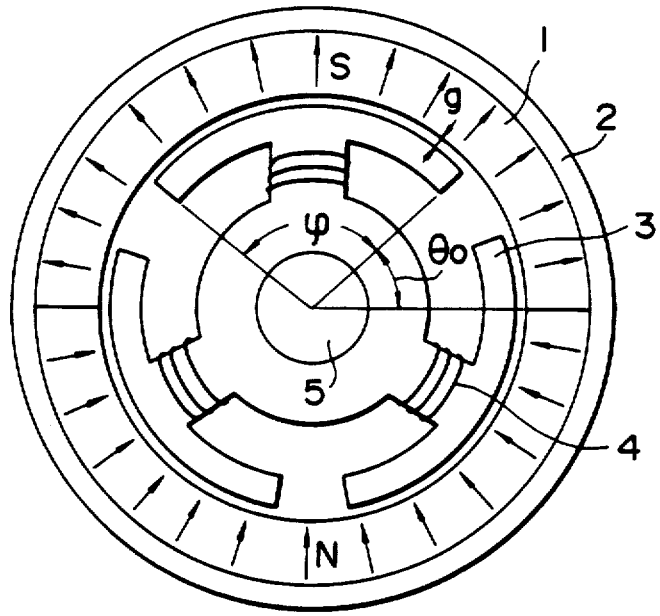
FIG. 14(a) is a schematic view in cross section of a prior art motor having permanent magnets whose magnetization are directed along the radial direction.
Figure 14B:
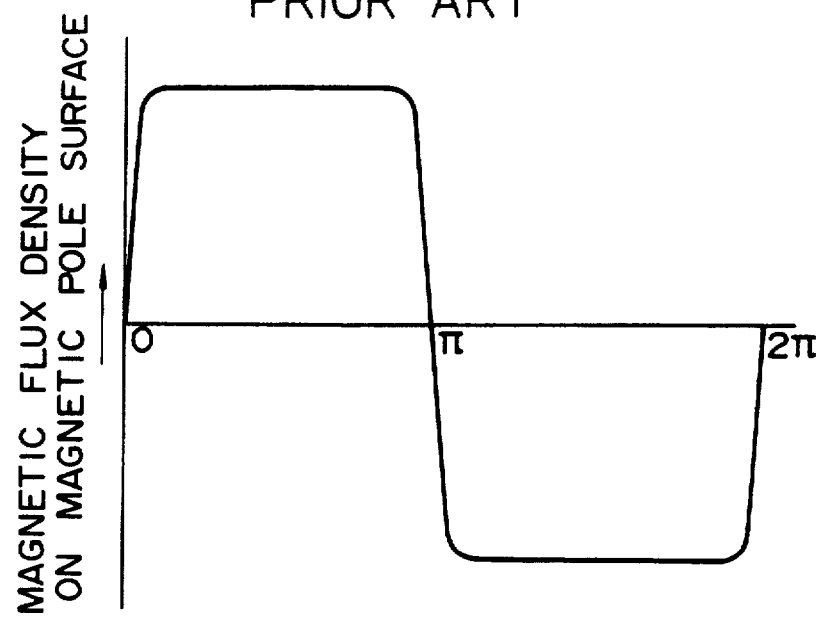
FIG. 14(b) is a view illustrating the surface magnetic flux density on the magnetic pole surface in the motor of FIG. 14(a)

The principle on which the present invention is based is described prior to the explanation of the embodiments. For this purpose, the simplest motor with two magnetic poles and three protruding poles, as shown in FIG. 14(a), is exemplified.

Generally, a torque TQ of a radial gap type motor is expressed by the following equation (2):

$$TQ = -\frac{v_o R}{2} \int_0^{2\pi} F_r(\theta) \cdot F_\theta(\theta) d\theta \quad (2)$$

where $F_r(\theta)$ is an amount of magnetic flux along the radial direction within the gap g, $F_\theta(\theta)$ is an amount of magnetic flux along the rotational direction within the gap g, R is a radius at the location of the gap g, and $v_o$ is a reluctivity in the gap g.

In FIG. 14(a), $\theta$ is specified as an angle subtended, in the motor rotational direction, by the pole surface of the protruding pole, and $\theta_o$ is specified as an angle formed by the one end, in motor rotational direction, of the pole surface of the protruding pole and a reference angular position. As shown in the above equation (2), since the torque TQ is generated in accordance with the product of $F_r(\theta) \cdot F_\theta(\theta)$, it may be considered that the torque TQ is generated only within the gap between the protruding pole and the permanent magnet, where the magnetic flux density becomes large. Accordingly, it is sufficient to perform the integral in the above equation (2) only over the range within the gap where the protruding pole exists.

If it is assumed that $F_r(\theta)$, the amount of magnetic flux along the radial direction, is generated by the magnetic poles of the magnetic pieces 1, the distribution of the magnetic flux relative to the rotational angle can be expressed in a composite form of the fundamental sine wave component and higher harmonic sine wave components. Namely, if T is defined as one period of rotation of the armature through an angle corresponding to a pair of N-pole and S-pole, which is $2\pi$ in this case, $2\pi n\theta/T$ is written as $n\theta$, then $F_r(\theta)$ can be expressed as follows:

$$F_r(\theta) = F_o \left( \sin\theta + \sum_{n=2}^{\infty} \beta_n \cdot \sin n\theta \right) \quad (3)$$

where $F_o$ is a constant, n is an integer larger than 1 and $\beta_n$ is a mixing ratio of n-th-order component to the fundamental (first-order) component.

If $\beta_n$ is written as $(b_n/b_l)$ and $F_o$ is equal to $b_l$ in the above equation (3), the form of the rewritten equation coincides with that of the equation (1) wherein both constant $h_o$ and cosine components are zero. Therefore, it is understood that the amount of magnetic flux $F_r(\theta)$ has a linear relationship to the widthwise length $h(\theta)$ of the magnetic flux generating area.

The amount of magnetic flux $F_\theta(\theta)$ along the rotational direction can be obtained by differentiating $F_r(\theta)$ with respect to the rotational angle, which is expressed as follows:

$$F_\theta(\theta) = -\frac{dF_r(\theta)}{d\theta} = -F_o \left( \cos\theta + \sum_{n=2}^{\infty} \beta_n \cdot n\cos n\theta \right) \quad (4)$$

Now considering only the fundamental wave component and n-th-order (specified one) wave component in the product of $F_r(\theta) \cdot F_\theta(\theta)$ in the above equation (2), the product is rewritten as follows:

$$\begin{aligned}F_r(\theta) \cdot F_\theta(\theta) &= -F_r(\theta) \frac{dF_r(\theta)}{d\theta} \\ &= -F_0^2 \left( \frac{1}{2}\sin 2\theta + \frac{n\beta_n}{2} \{\sin(n+1)\theta - \sin(n-1)\theta\} + \right. \\ &\quad \left. \frac{\beta_n}{2} \{\sin(n+1)\theta + \sin(n-1)\theta\} + \beta_n^2 \sin n\theta \cdot \cos n\theta \right)\end{aligned} \quad (5)$$

In the above equation (5) the last term is negligible because the ratio $\beta_n$ of the n-th-order wave component to the fundamental wave component is usually small, therefore, $\beta_n^2$ is considered to be considerably smaller than 1 ($\beta_n^2 \ll 1$).

If the magnetic flux $F_r(\theta)$ generated by the magnetic piece 1 contains only the k-th-order component, the product $F_r(\theta) \cdot F_\theta(\theta)$ in the above equation (2) is rewritten as follows:

$$F_r(\theta) \cdot F_\theta(\theta) = -F_0^2 \cdot \frac{k}{2} \sin 2k\theta \quad (6)$$

When the magnetic flux generated by the magnetic pieces 1 has a single higher-order sine wave component, a cogging torque is generated if the order is equal to an integer times of the number of the protruding poles (3, 6, 9, ... in the motor of this case), and otherwise a cogging torque is not generated. In other words, in this motor, a cogging torque is generated when $n \pm 1$ is equal to an integer times of 3 in the above equation (5). Comparing the equations (5) and (6), it is clearly understood that $n \pm 1$ corresponds to $2k$. Namely, a cogging torque is generated in this motor when n-th-order mode of the magnetic flux satisfying the condition that $(n \pm 1)/2$ is equal to a multiple of 3 is added to the fundamental mode. For example, in the case of $n=5$, no cogging torque is generated when only fifth-order mode exists in the magnetic flux, but a cogging torque due to single third-order mode is generated when only a small amount of fifth-order mode is added to the fundamental mode, that is, when $(5 \pm 1)/2 = 3$. On the contrary, when the higher-order mode which is apt to cause a cogging torque by itself, is combined with the fundamental mode, the higher-order mode affects only the term $\beta_n^2$ in the equation (5), therefore, a cogging torque is generated only a little.

In consideration of the above matters, the present invention intends to eliminate the cogging torque by adjusting the widthwise length of the magnetic flux generating area of the field magnet system by incorporating into the widthwise length the variation corresponding to the selected harmonic wave components which cause the cogging torque.

Figure 16:
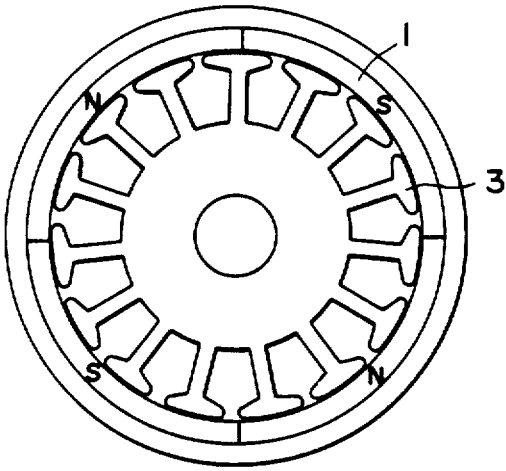
FIG. 16 is a schematic view in cross section of a prior art motor having four permanent magnets and 15 protruding poles.
Figure 17:
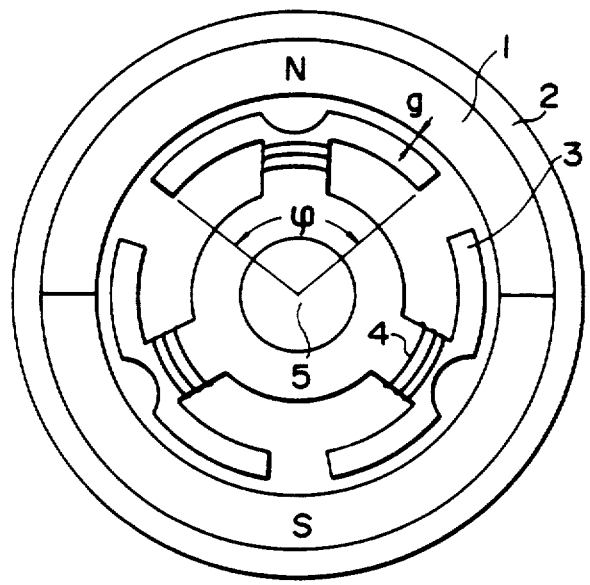
FIG. 17 is a schematic view in cross section of a prior art motor whose protruding poles each has an auxiliary groove formed therein.

The number m of protruding poles in the present invention coincides with the number of coils 4 composing each phase in the case of a motor provided with normal concentrated windings as shown in FIG. 14(a). However, in the case of a motor provided with a large number of protruding poles and distributed windings as shown in FIG. 16, the number m is not the number of coils 4, but the number of protruding poles itself. In addition, in the case of a motor with main protruding poles in each of which is formed an auxiliary groove as shown in FIG. 17, the number m is the number of these small protruding portions.

Hereinafter the embodiments based on the principle of the present invention will be explained.

Figure 1A:
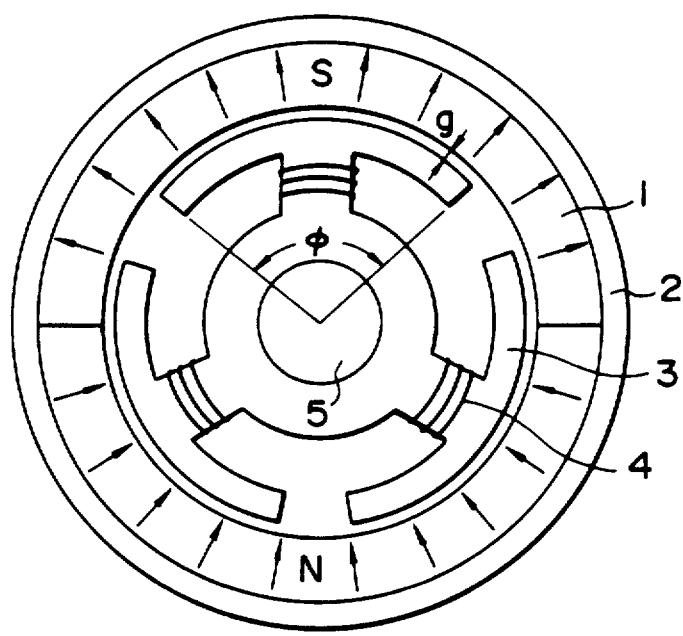
FIG. 1(a) is a schematic view in cross section of a motor of the embodiment of one invention.
Figure 1B:
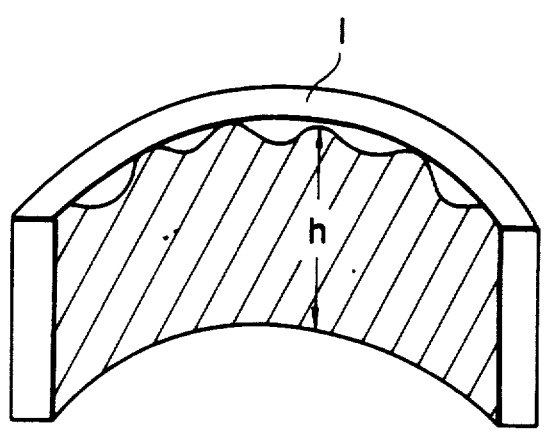
FIG. 1(b) is a perspective view illustrating magnetic pieces in FIG. 1.

FIGS. 1(a) to 1(d) are schematic views showing the first embodiment of the present invention, in which the principle is applied to the radial gap type motor with two magnetic poles, three protruding poles and concentrated windings (not shown) as shown in FIG. 14(a). In this motor, the magnetic pieces 1 have a magnetized area whose widthwise length h, perpendicular to the motor rotational direction, includes an adjusting amount corresponding to higher harmonic wave components as shown in FIG. 1(b), or the magnetic pieces have a shape whose widthwise length h includes an adjusting amount corresponding to higher harmonic wave component as shown in FIGS. 1(c) and (d). In this specification, the widthwise length h means a length of the magnetized area along the direction of the motor rotational axis in case of the radial gap type motor, and means a length of the same along the radial direction of the motor in case of the axial gap type motor.

Figure 2A:
FIG. 2(a) is a view illustrating the fifth-order mode schematically.
Figure 2B:
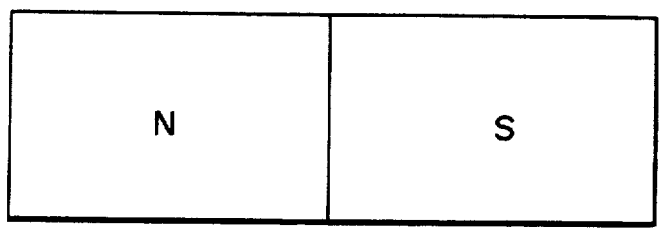
FIG. 2(b) is a view illustrating the fundamental mode schematically.
Figure 2C:
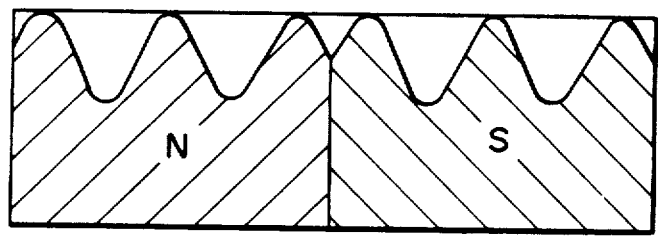
FIG. 2(c) is a view illustrating a magnetic pole surface including a magnetic flux generating area therein.
Figure 2D:
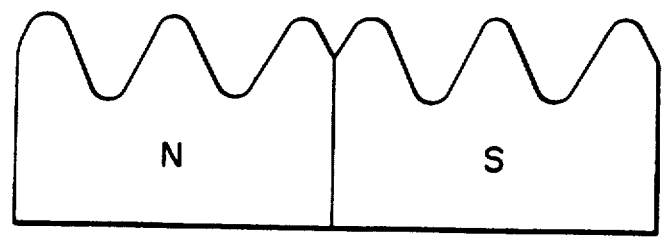
FIG. 2(d) is a view illustrating a magnetic pole surface whose whole area coincides with a magnetic flux generating area.

FIGS. 2(a) to 2(d) are schematic views explaining the method of incorporating the fifth-order harmonic wave component into the fundamental wave component. FIG. 2(a) shows the fifth-order mode and FIG. 2(b) shows the fundamental mode, but for simplicity, the shape of the fundamental mode is not represented by a sine wave, but by a rectangle in FIG. 2(b). The combination of the modes in FIGS. 2(a) and 2(b) gives the pattern in FIG. 2(c) or the shape in FIG. 2(d). It is understood that only a change of the widthwise length of the magnetized area of the permanent magnets permits the incorporation of the higher-order mode into the fundamental mode.

Figure 15A:
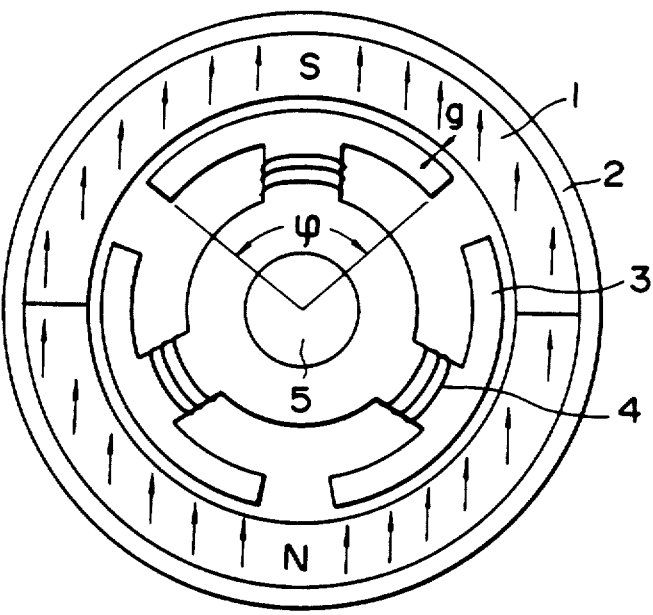
FIG. 15(a) is a schematic view in cross section of a prior art motor having permanent magnets whose magnetization directs along specified one direction.

The direction of magnetization of the permanent magnet used in the prior art motor is usually along the radial direction, as shown in FIG. 14(a), or along one specified direction as shown in FIG. 15(a). The magnetic flux on the magnetic pole surface of the magnetic pieces 1 distributes in a sinusoidal form in the case of motor of FIG. 15(a), and in a rectangular or trapezoidal form in the case of motor of FIG. 14(a). However, even if the magnetic flux distributes in a rectangular or trapezoidal form, when a function representing the distribution of the magnetic flux, is expanded in a Fourier series, its largest component is the first-order, fundamental wave. Accordingly, it is sufficient to investigate the incorporation of higher-order mode into the fundamental mode.

Figure 3:
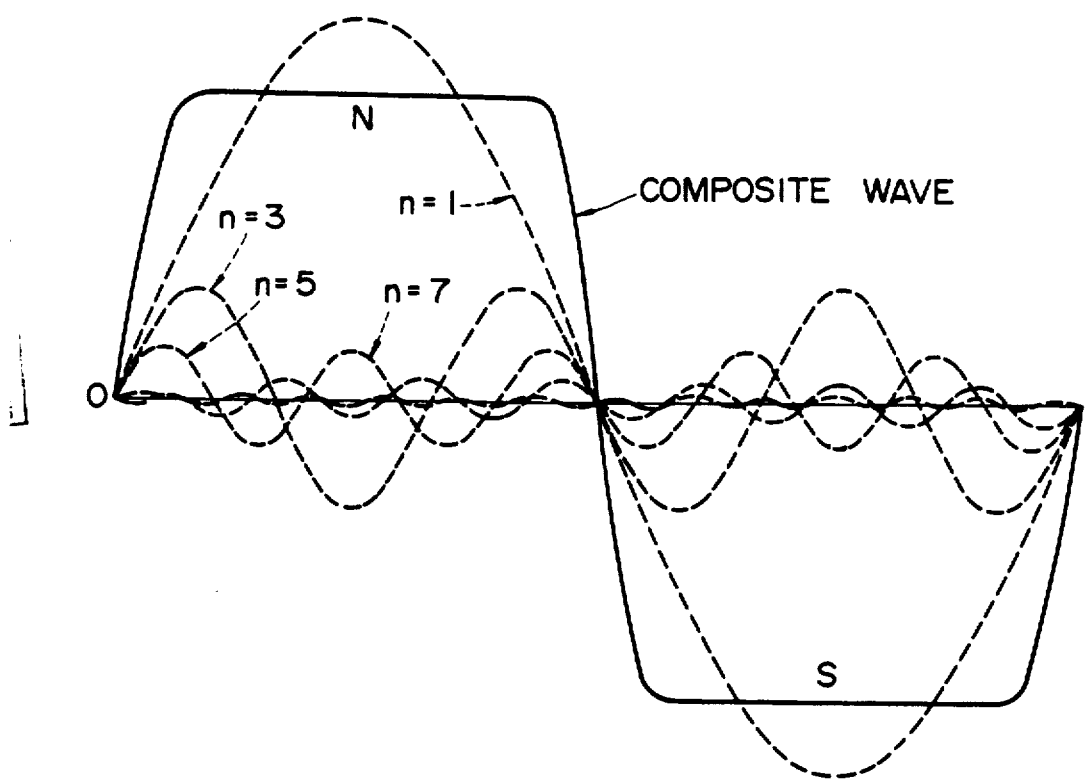
FIG. 3 is a view illustrating the distribution of the magnetic flux density on the magnetic pole surface of the prior art motor relative to the rotational direction.
Figure 4:
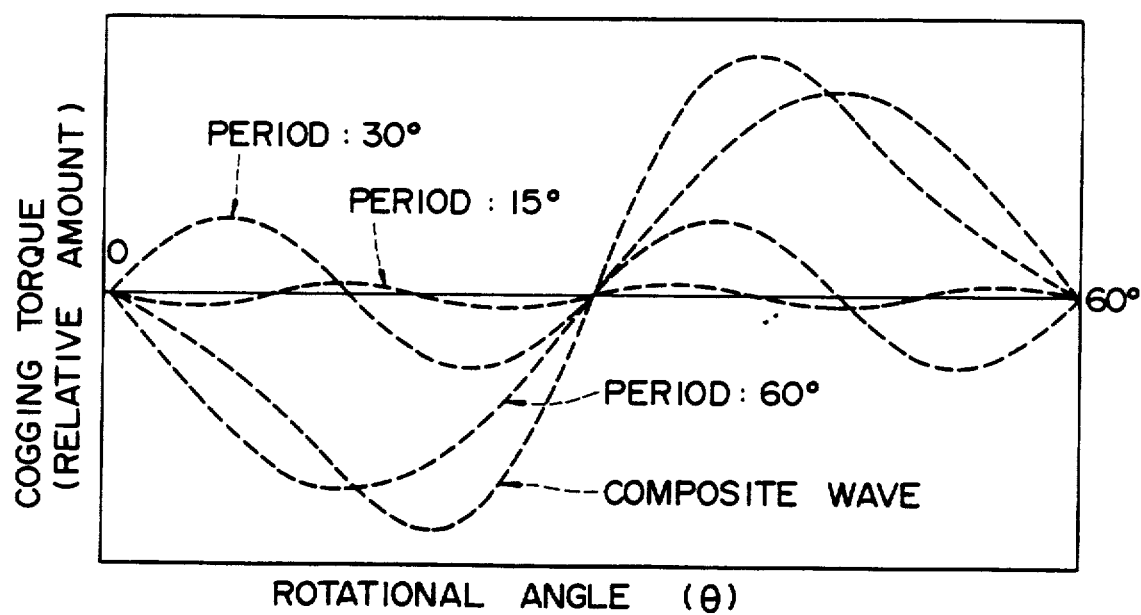
FIG. 4 is a view illustrating cogging torque characteristic of the prior art motor.

FIG. 3 shows the distribution of the magnetic flux on the magnetic pole surface of the magnetic pieces 1 in the prior art motor as shown in FIG. 14(a). This magnetic flux includes higher odd-number-order modes in addition to the fundamental mode. The cogging torque of this motor is shown in FIG. 4. As seen from FIG. 4 the cogging torque includes components having periods of 60°, 30° and 15°, as described above, the cogging torque component having a period of 60° is caused from the fifth-order and seventh-order components of the magnetic flux. The cogging torque component having a period of 30° is caused from the eleventh-order and thirteenth-order components. The cogging torque component having a period of 15° is caused from the seventeenth-order and nineteenth-order components.

Figure 5A:
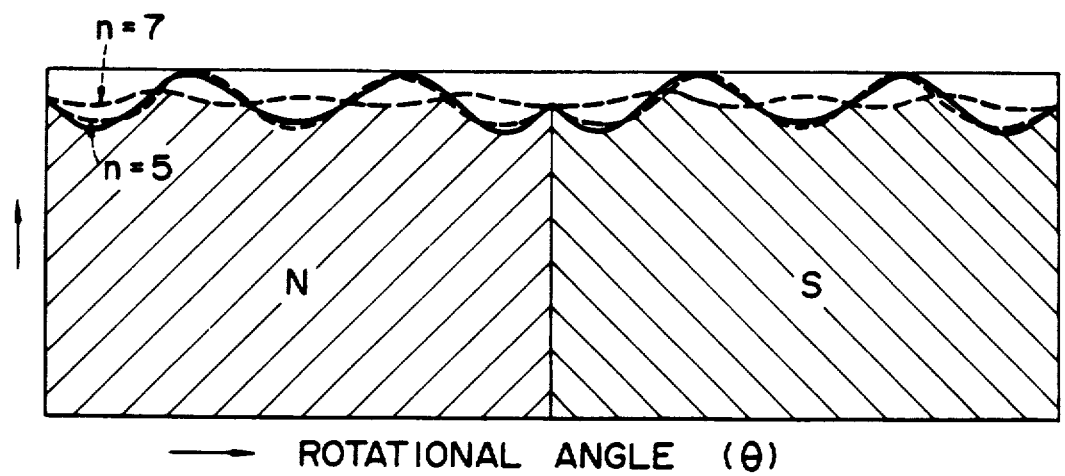
FIG. 5(a) is a view illustrating the magnetized pattern of the permanent magnets into which fifth-order and seventh-order modes are incorporated in accordance with the present invention.
Figure 5B:
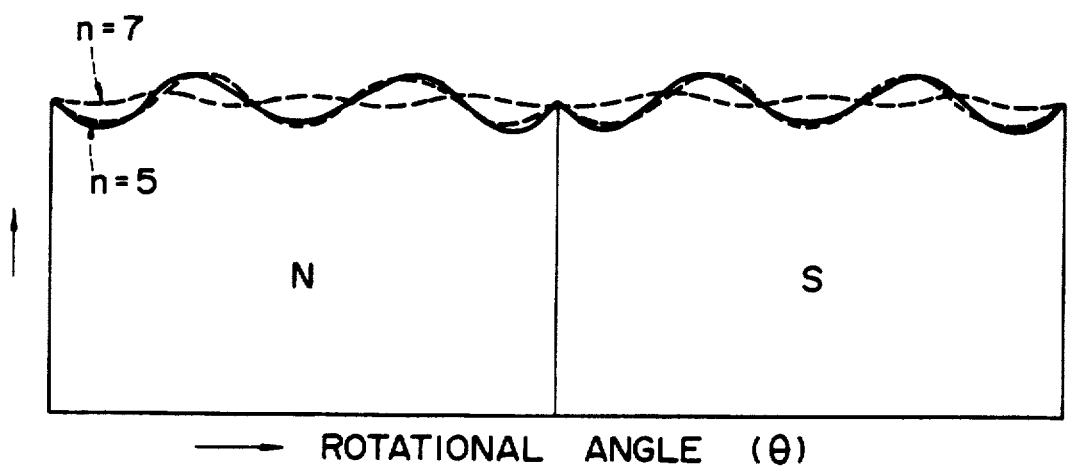
FIG. 5(b) is a view illustrating the magnet shape of the permanent magnets into which fifth-order and seventh-order modes are incorporated in accordance with the present invention.

FIGS. 5(a) and 5(b) show a magnetized pattern and a magnet shape, respectively, in which −8% of fifth-order mode and −3% of seventh-order mode are incorporated into the fundamental mode in order to eliminate the fifth-order mode and seventh-order mode which are originally included in the permanent magnets. The cogging torque generated by the motor using such permanent magnets is shown in FIG. 6.

Figure 6:
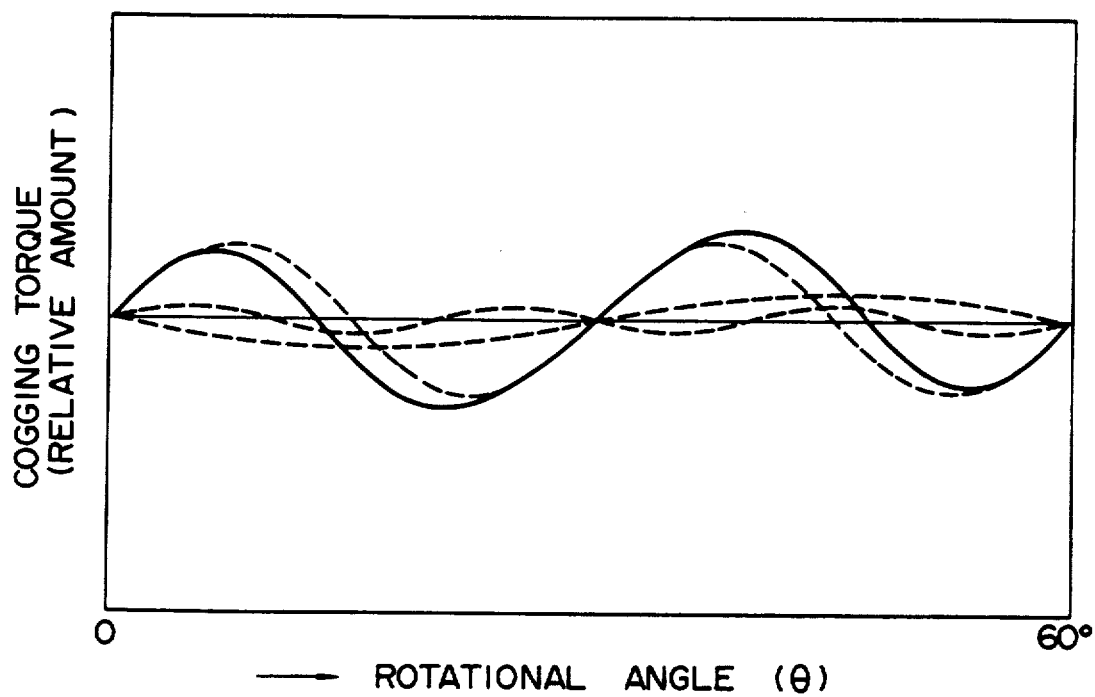
FIGS. 6 is a view illustrating cogging torque characteristic of the motor using the permanent magnets in FIG. 5.

It is clearly understood from FIG. 6 that the reduction of the fifth-order mode and seventh-order mode of the magnetic flux results in the elimination of almost all of the cogging torque having a period of 60° and leaving only the more higher-order mode cogging torques. The cogging torque having a period of 30° can be reduced in the same manner as above, by incorporating eleventh-order mode and thirteenth-order mode in the magnetized pattern or the magnet shape.

Figure 7A:
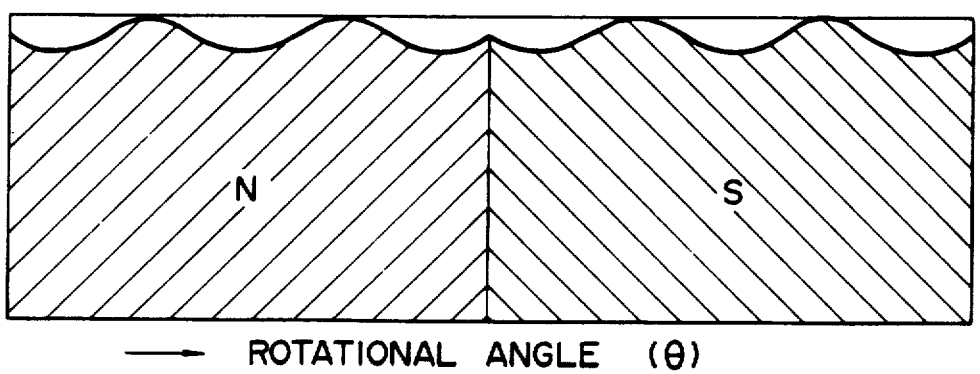
FIG. 7(a) is a view illustrating the magnetized pattern of the permanent magnets into which only fifth-order mode is incorporated in accordance with the present invention.
Figure 7B:
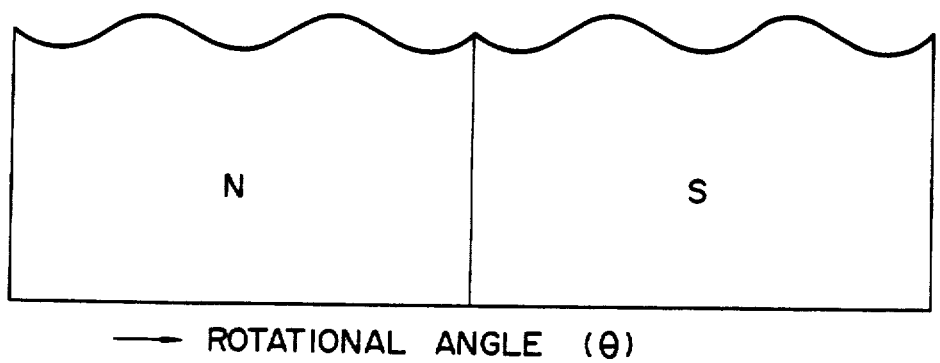
FIG. 7(b) is a view illustrating the magnet shape of the permanent magnets into which only fifth-order mode is incorporated in accordance with the present invention.
Figure 8:
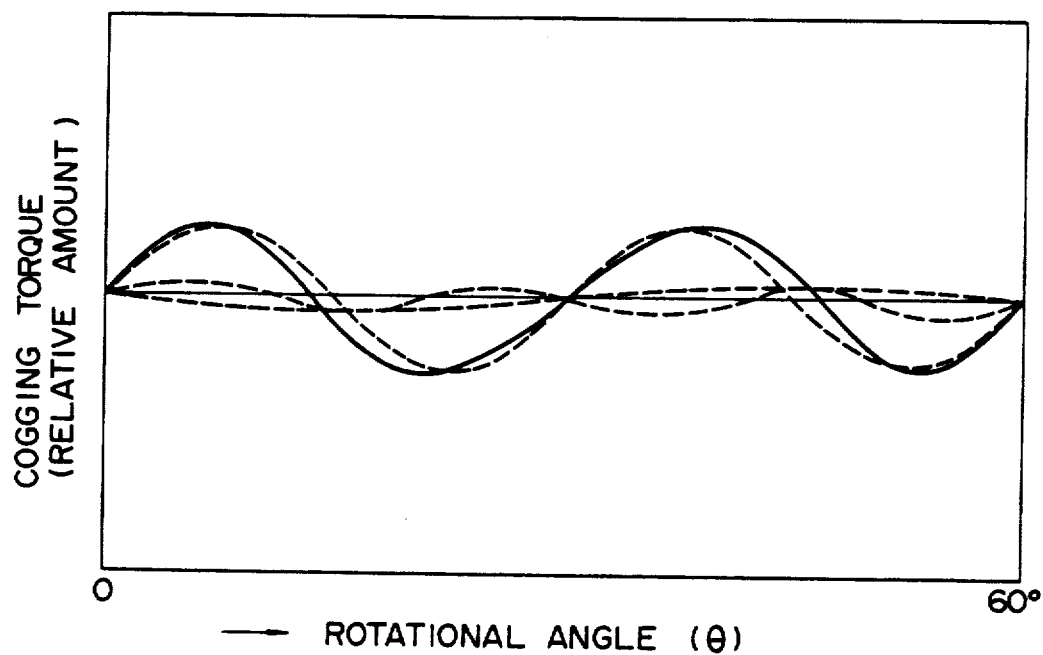
FIG. 8 is a view illustrating cogging torque characteristic of the motor using the permanent magnets in FIGS. 7.

FIGS. 7(a) and 7(b) schematically show a magnetized pattern and a magnet shape, respectively, in which −5% of fifth-order mode is incorporated into the fundamental mode so that the fifth-order component coincides with the seventh-order component of the magnetic flux generated by the magnetic poles of the magnetic pieces 1. Also, in this case, as shown in FIG. 8, the cogging torque having a period of 60° is found to be very small. Namely the cogging torque generated by the fifth-order mode of the magnetic flux has an opposite phase to that generated by the seventh-order mode. As a result, even if a magnetized pattern or a magnet shape includes both fifth-order component and seventh-order component, the total cogging torque becomes so small when the amount (including positive and negative signs) as the former component is at the same degree as the latter component and the sign in the former is same as the latter. This phenomenon is very important. The mode such as fifth-order one or seventh-order one gives a large affect on the driving torque pattern. Even if a proper amount of fifth-order mode or seventh-order mode is incorporated into a magnetized pattern or a magnet shape depending on a driving form of motor, the cogging torque becomes almost zero when the absolute values of of the modes are identical. Accordingly, a driving torque pattern can be controlled at the condition of zero cogging torque.

Figure 9A:
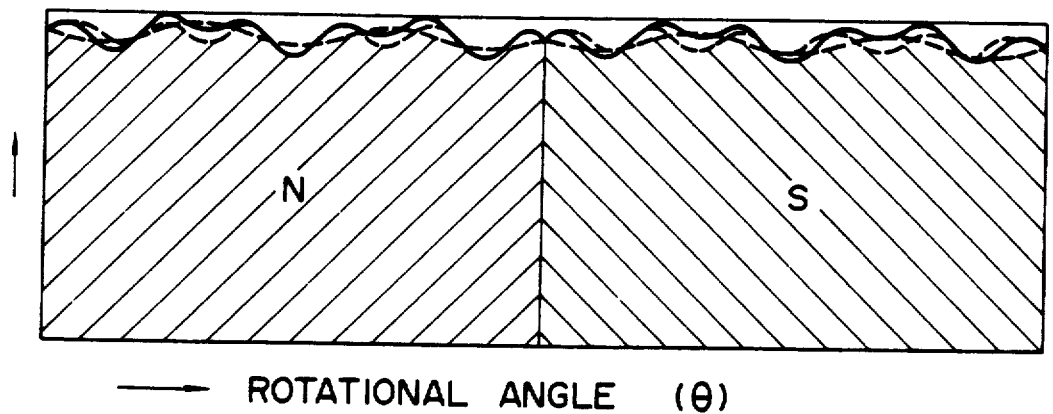
FIG. 9(a) is a view illustrating the magnetized pattern of the permanent magnets into which fifth-order and eleventh-order modes are incorporated in accordance with the present invention.
Figure 9B:
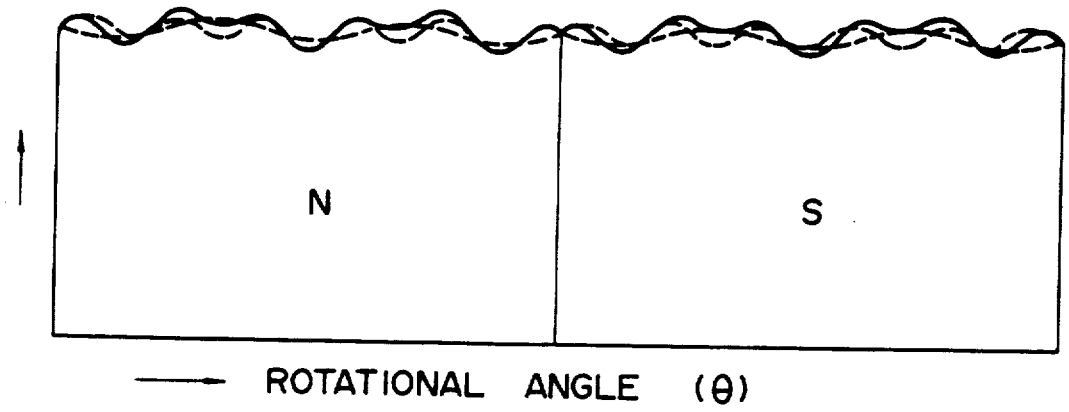
FIG. 9(b) is a view illustrating the magnet shape of the permanent magnets into which fifth-order and eleventh-order modes are incorporated in accordance with the present invention.
Figure 10:
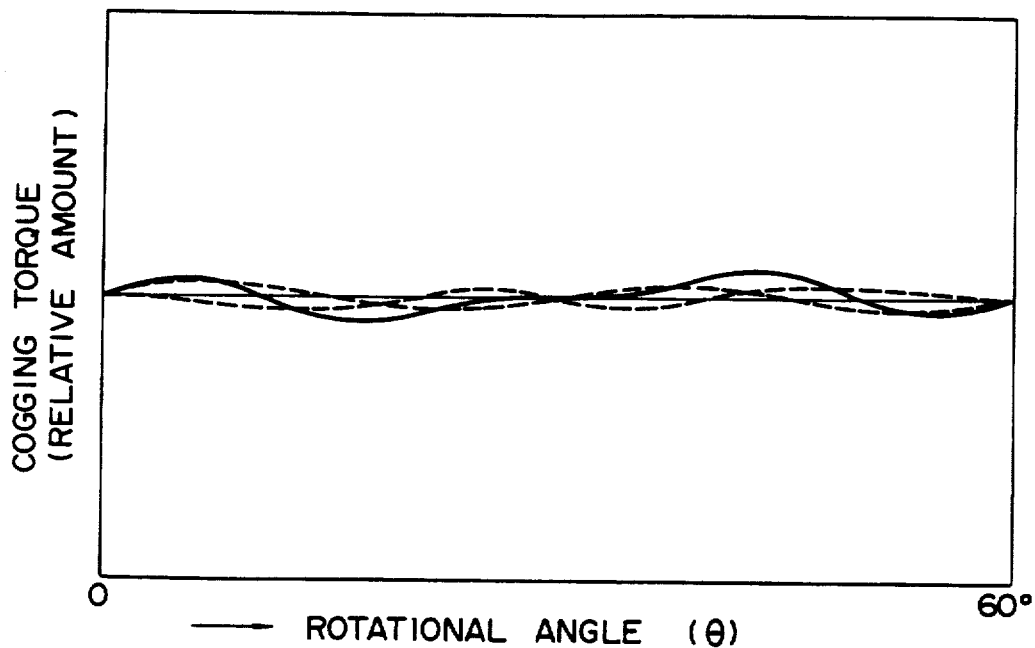
FIG. 10 is a view illustrating cogging torque characteristic of the motor using the permanent magnets in FIGS. 9.

FIGS. 9(a) and 9(b) schematically show a magnetized pattern and magnet shape of the permanent magnets of the motor shown in FIG. 14(a), into which is incorporated the fifth-order mode and eleventh-order mode. Also, in this case, the cogging torque becomes considerably small, as shown in FIG. 10.

FIG. 16 shows a prior art motor, provided with four magnetic poles formed by usual permanent magnets, 15 protruding poles and distributed windings, which is suitably used for and AC servomotor. This motor generates a cogging torque containing a large number of components having period of 3°, 6°, . . . This invention can be applied to this motor as follows:

In the motor, m = 4 (number of magnetic poles),
p = 15 (number of protruding poles),
q = 1 (greatest common measure of m/2 and p),
i = 15 (p/q), and
j = 2 (an even number of 2 to 20, but for simplicity, j is set to 2 in this example)

Therefore, $$n = (i \times j) \pm 1$$
$$= (15 \times 2) \pm 1 = 31 \text{ or } 29.$$

Using above values, the equation (1) can be rewritten as follows:

$$h(\theta) = h_o + b_{29} \sin 29\theta + b_{31} \sin 31\theta$$

The coefficients $b_{29}$ and $b_{31}$ can be determined from a characteristic chart of the cogging torque to minimize the cogging torque.

FIG. 17 shows another type of prior art motor having protruding poles in each of which is formed an auxiliary groove. When the present invention is applied to this motor, the number of the protruding poles affecting the cogging torque is considered as six. In this case, n-th order component satisfying that n is equal to $6j \pm 1$ where j is a even number of 2 to 20 may be incorporated into the magnetized pattern or the magnet shape of the permanent magnets.

Figure 15B:
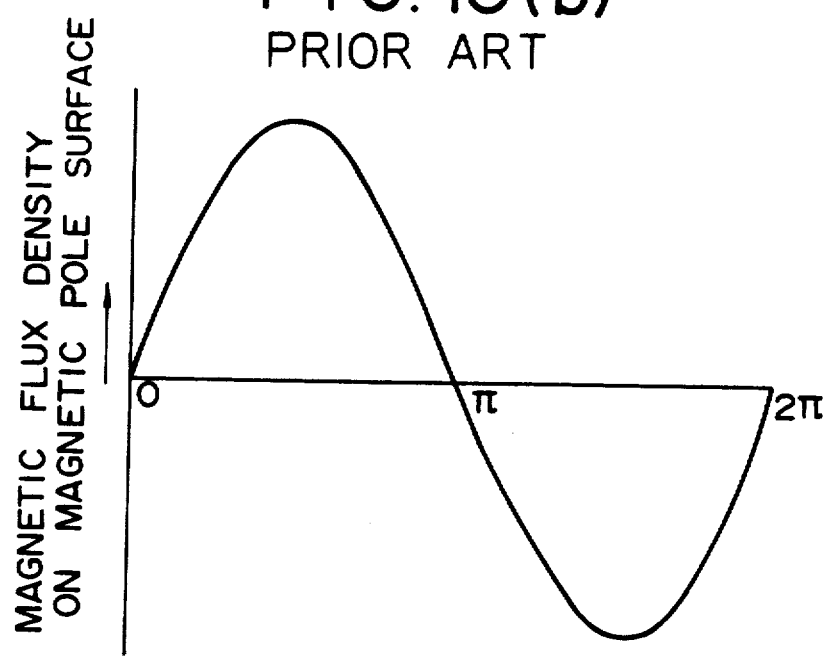
FIG. 15(b) is a view illustrating the surface magnetic flux density on the magnetic pole surface in the motor of FIG. 15(a).

Although in the above embodiments, the adjustment of the widthwise length has been made to the permanent magnets of the motor, whose magnetization are directed along the radial direction, the present invention can be also applied to a motor having permanent magnets whose magnetization are directed along only one specified direction as shown in FIG. 15(a), for eliminating a torque ripple in the same manner as above. In this case, the distribution of the magnetic flux density on the magnetic pole surface is occupied almost entirely by the first-order component as shown in FIG.15(b). Accordingly, the incorporation of n-th order mode into such permanent magnets by varying the magnetized pattern thereof in the widthwise direction in this case means the incorporation of higher-order mode of $\beta_n \sin n\theta \cdot |\sin\theta|$ into the magnetic flux.

Figure 11:
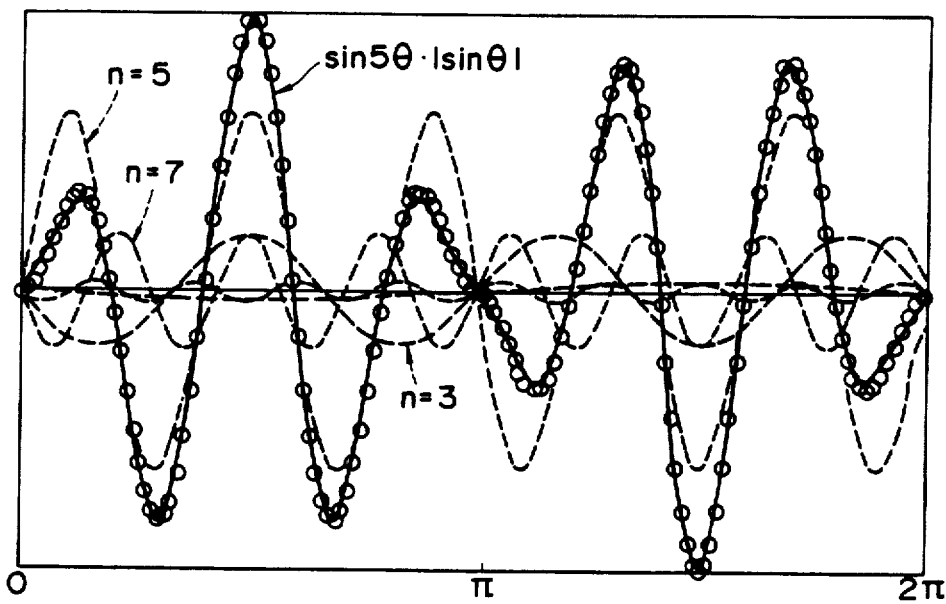
FIG. 11 is a view illustrating driving torque characteristics when fifth-order mode is incorporated in the permanent magnets in the prior motor.

FIG. 11 shows what kind of higher harmonic waves are actually added to the magnetic flux pattern when n is 5 and $\beta_5$ is 1. It is clear from FIG. 11 that the added fifth-order component is reduced to about 60% of its original value, about 20% of negative seventh-order mode is generated and a small amount of 3k (where k is an integer) components are also generated. Accordingly, when the present invention is applied to such motor, the same effects can be obtained as in the motor using the permanent magnets whose magnetization are directed along the radial direction, by controlling the added components in consideration of these matters.

Figure 18:
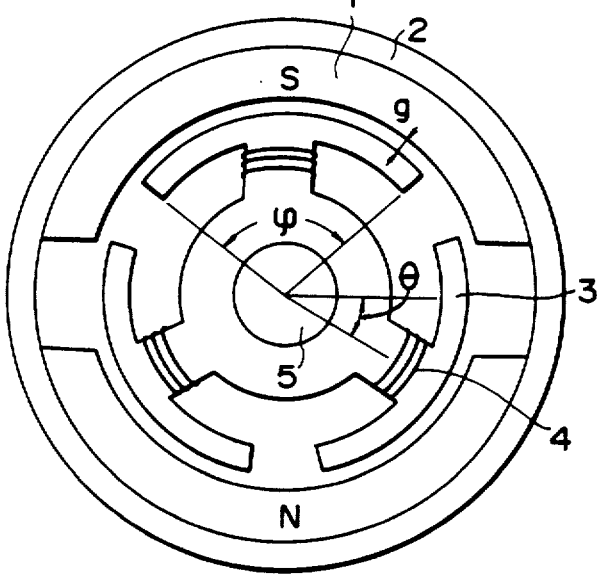
FIG. 18 is a schematic view in cross section of prior art motor using C-shaped permanent magnets.

FIG. 18 shows still a further example of the prior art motor using C-shaped magnets whose magnetization are directed along one specified direction and whose one pole subtends an angle less than 180°. This invention can be also applied to such motor in the following manner.

Figure 12:
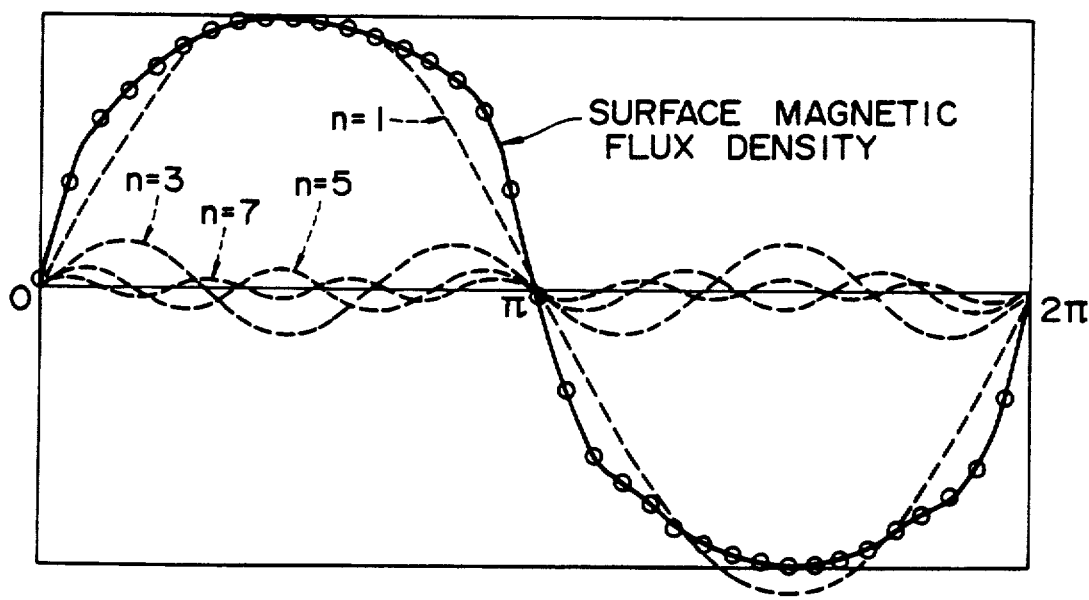
FIG. 12 is a view illustrating the distribution of the surface magnetic flux density of the motor using the C-shaped permanent magnets.

FIG. 12 shows a decomposition of a surface magnetic flux, generated by the C-type magnet whose subtending angle is 150° into each-order of harmonic waves. In using the permanent magnets magnetized in one specified direction, the $F_r(\theta)$ component in the equation (2) is not zero at the portion where the permanent magnet does not exists, and a small amount of higher harmonic waves are added to the fundamental wave. When the n-th-order mode is incorporated into the magnetized area of the permanent magnet by varying its magnetized pattern the higher harmonic waves having the following $F_r(\theta)$ component is actually incorporated into the magnetic flux.

$F_r(\theta) = \beta_n \cdot \sin\theta \cdot |\sin\theta|$ $$\left( \text{where } \frac{\pi}{12} \leq \theta \leq \frac{11}{12}\pi, \frac{13}{12}\pi \leq \theta \leq \frac{23}{12}\pi \right)$$

$F_r(\theta) = 0$ $$\left( \text{where } 0 \leq \theta < \frac{\pi}{12}, \frac{11}{12}\pi < \theta < \frac{13}{12}\pi, \frac{23}{12}\pi < \theta < 2\pi \right)$$

Figure 13:
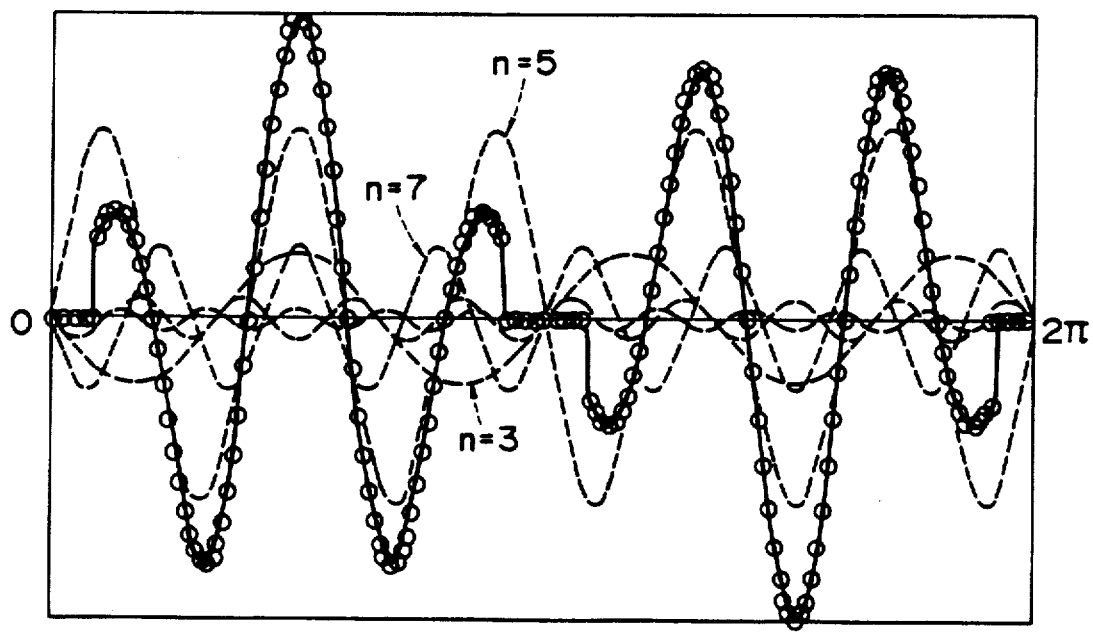
FIG. 13 is a view illustrating driving torque characteristics when fifth-order mode is incorporated in the permanent magnets in the prior art motor.

FIG. 13 shows what kind of higher harmonic waves are actually added to the magnetic flux pattern when n is 5 and $\beta_5$ is 1. In this case, the situation is substantially the same as the prior art motor using the permanent magnets as shown in FIG. 15(a) except that 3k-th and (3k±1)-th-order components are generated in addition to the added components. Accordingly, when the present invention is applied to such motor wherein the permanent magnets are not arranged all along the periphery, the same effects as above can be obtained by incorporating the higher-order modes into the magnetized pattern or the magnet shape of the permanent magnets. In this case, it is important to control the amounts of higher-order modes to be added newly in consideration of the ratio of the higher-order modes existing therein originally, because the magnetic flux includes a large amount of higher-order modes.

In the case of the motor wherein the field magnet system does not exist at some regions of the periphery in the motor is rotational direction, when the widthwise length of the field magnet system is expanded in a Fourier series in terms of a rotational angle, the Fourier series includes higher-order components. Therefore, the Fourier coefficients may be selected by changing the angle subtended by the field magnet system for controlling a cogging torque. However, such method controls only one specified mode of cogging torque and does not reduce the absolute value of the cogging torque. For this reason, such method is not within the range of the present invention.

Having described the present invention in connection with embodiments thereof, it is to be understood that the present invention is not limited to the above embodiments and many modifications can be made within the technical concept of the present invention.

What is claimed is:

1. A motor comprising:
   a field magnet system comprising m-number of permanent magnetic poles arranged in a circle such that the adjacent two permanent magnetic poles have opposite polarity to each other; and
   an armature with p-number of poles, the outer end of each of the poles facing the magnetic poles of the field magnet system:
   said field magnet system having a magnetic flux generating area whose widthwise length h ($\theta$) perpendicular to the rotational direction of the armature varies with a rotational angle $\theta$ of the armature in accordance with the following formula:

$$h(\theta) = h_0 + \sum_{n=1}^{\infty} a_n \cos(2\pi n\theta/T) + \sum_{n=1}^{\infty} b_n \sin(2\pi n\theta/T)$$

wherein n is an integer of $(i \times j) \pm 1$ where j is an even number of 2 to 20,
$a_n$ is a coefficient for cosine components,
$b_n$ is a coefficient for sine components and is not zero for at least one value of n,
T is a period of rotation of the armature through an angle corresponding to the peripheral length of a pair of adjacent N-pole and S-pole
i is an integer given by p/q where q is the greatest common measure of m/2 and p, and
$h_o$ is equal to H when $0 \leq \theta < \pi$ and equal to $-H$ when $\pi \leq \theta < 2\pi$ where H is a standard widthwise length of the field magnet system.

2. A motor as claimed in claim 1, in which said field magnet system has a shape so that its widthwise length satisfies the above formula.

3. A motor as claimed in claim 1, in which the coefficient $b_n$ is determined so that the $(i \times j + 1)$th-order component coincides with the $(i \times j \ 1)$th-order component of the higher-order sine wave components of the magnetic flux.

4. A method of trimming a torque characteristic of a motor comprising a field magnet system with a constant widthwise length comprising plural permanent magnetic poles arranged in a circle such that the adjacent two permanent magnetic poles have opposite polarity to each other, and an armature with plural poles, the outer end surface of each of the poles facing the magnetic poles of the field magnet system, said method comprising the steps of:
   measuring the distribution of the magnetic flux generated by the field magnet system relative to the rotational angle of the armature;
   evaluating harmonic wave components of the magnetic flux generated by the field magnet system by expanding in a series a function expressing the distribution curve of the magnetic flux;

measuring the cogging torque generated by the field magnet system relative to the rotational angle of the armature;

examining the relationship between the harmonic wave components of the magnetic flux and the cogging torque; and adjusting the widthwise length of the magnetic flux generating area of the field magnet system by incorporating into the widthwise length the variation corresponding to the selected harmonic wave components which cause the cogging torque to be eliminated.

* * * * *